United States Patent [19]
Stimson

[11] Patent Number: 5,263,900
[45] Date of Patent: Nov. 23, 1993

[54] ABS WHEEL HUB ASSEMBLY AND METHOD OF MAKING THE SAME

[75] Inventor: Thomas B. Stimson, Commerce Township, Oakland County, Mich.

[73] Assignee: The Budd Company, Troy, Mich.

[21] Appl. No.: 974,974

[22] Filed: Nov. 12, 1992

[51] Int. Cl.⁵ .............................................. G01P 3/48
[52] U.S. Cl. ..................... 188/181 R; 188/18 A; 310/168
[58] Field of Search ............. 188/181 A, 181 R, 18 A; 301/105.1; 384/448; 324/207.25; 310/168

[56] References Cited

U.S. PATENT DOCUMENTS

| | | | |
|---|---|---|---|
| 3,887,046 | 6/1975 | Bueler | 188/181 A |
| 3,921,702 | 11/1975 | Ward | 164/112 |
| 4,069,435 | 1/1978 | Wannerskog et al. | 310/168 |
| 4,132,293 | 1/1979 | Jovick | 188/181 R |
| 4,698,536 | 10/1987 | Oohori | 310/168 |
| 4,795,278 | 1/1989 | Hayashi | 310/168 |
| 4,864,231 | 9/1989 | Okumura et al. | 188/181 R |
| 5,067,597 | 11/1991 | Young | 188/181 R |
| 5,127,747 | 7/1992 | Hilby et al. | 310/168 |

FOREIGN PATENT DOCUMENTS 4-38256  2/1992  Japan ................... 188/181 R

*Primary Examiner*—Mark T. Le
*Attorney, Agent, or Firm*—Harness, Dickey & Pierce

[57] ABSTRACT

A wheel hub assembly for an anti-lock braking system including a method of making the same. The present invention includes a ferrous hub having a plurality of non-ferrous elements integrally cast into the hub. Each of the elements is substantially embedded in the hub and includes an exposed surface which is coincidental with the outer surface of the hub. During rotation of the assembly, a sensor will alternately sense the hub and the interruptions.

11 Claims, 3 Drawing Sheets

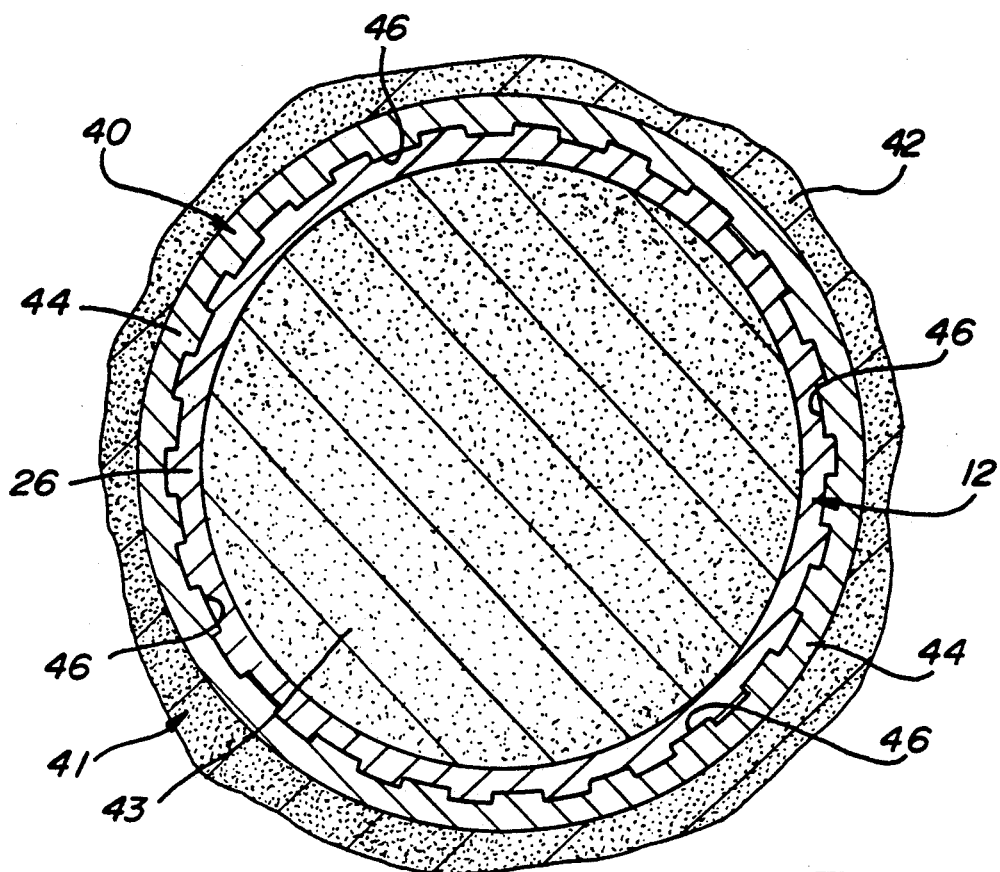
_Fig-2_
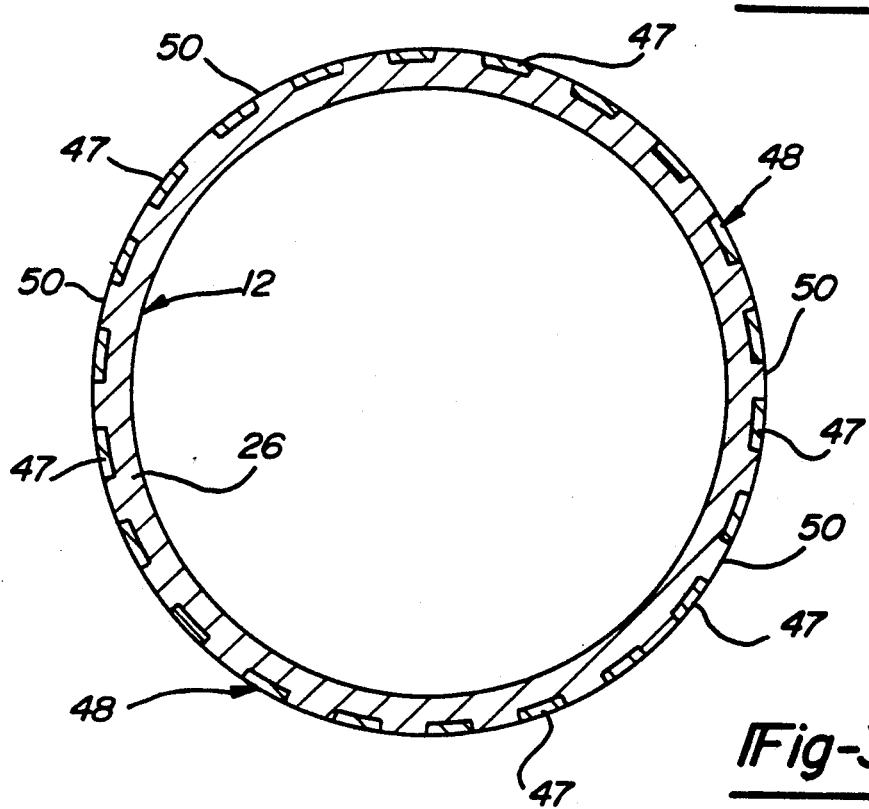
_Fig-3_

ABS WHEEL HUB ASSEMBLY AND METHOD OF MAKING THE SAME

BACKGROUND AND SUMMARY OF THE INVENTION

The invention relates to anti-lock braking systems (ABS) for vehicles and more particularly to a wheel hub assembly having an exciter element incorporated therein.

Many specific types of ABS systems are known. Typically, these systems utilize a sensing device which continuously monitors wheel speed and produces a signal representative of the wheel speed. From the wheel speed, acceleration or deceleration of the wheel is determined and correlated to impending wheel lock and potential skid situations. If a skid situation is impending, the ABS will regulate braking fluid pressure so as to maintain maximum braking force without inducing wheel lock. Wheel speed sensors are also incorporated into traction control systems which reduce wheel spin for enhanced traction.

Known anti-lock braking systems utilize a sensor to detect the movement of an exciter ring. The exciter ring is typically annular and is provided with radially outward toothed projections. The ring is mounted onto a hub which rotates with the wheel of the vehicle. The sensor, often a variable reluctance magnetic pick-up, is mounted adjacent to the exciter ring on a non-rotating structure, such as the axle support or housing. As each tooth of the exciter ring passes the sensor, an electrical pulse is generated. These pulses are then analyzed by a logic unit to determine the acceleration or deceleration of the rotating wheel.

In order to ensure proper operation of the ABS, maintaining the proper spacing between the sensor and the exciter ring is crucial. If this spacing exceeds defined tolerances, the sensor will fail to read the passing teeth and in inaccurate readings and improper functioning of the ABS will result.

One prior method for attaching the exciter ring to the hub has been to press fit the exciter ring onto a machined surface of the hub. In this method, both the exterior diameter of the hub and the interior diameter of the exciter ring required precise machining to ensure proper spacing between the teeth and the sensor and to prevent tolerance stackups from becoming excessive. While press-fit wheel hub assemblies have been used extensively and have worked satisfactorily, they have exhibited some limitations. One such limitation is the potential for the exciter ring to loosen from the hub. Other limitations include cracking of the exciter ring and distortion of the ring or hub during press fitting.

To compensate for potential loosening of the exciter ring from the hub and to eliminate tolerance stack up, wheel hub assemblies having the exciter ring integrally cast with the hub have been developed. In these hub assemblies, the exciter ring is positioned within a mold and cast material for the hub is poured to embed a portion of the exciter ring into the hub itself. The embedded portion of the exciter ring prevents loosening of the ring from the hub.

U.S. Pat. application Ser. No. 682,098, filed Apr. 5, 1991, which is commonly owned by the assignee of the present application, discloses a steel exciter ring which is integrally cast into a iron hub. Because of the compatibility between the two ferrous materials, molecular bonding occurs to firmly secure the exciter ring and the hub together.

Where non-compatible materials are used, such as when the hub is formed from a non-ferrous material and the ring is formed from a ferrous material, provisions must be made to interlock the hub with exciter ring and prevent subsequent loosening. Typically, these provisions include lugs or other interlocking protrusions which extend interiorly of the hub. These lugs, however, increase the weight, complexity and cost of the rings themselves.

With the teeth extending radially outward from the exciter ring and above the surface of the hub, the potential exists for dirt, stones, mud, sand, etc. to collect between adjacent teeth. These deposits often disrupt proper operation of the ABS. To prevent "clogging" of the teeth, various type of seals, guards and shields have been developed. The guards adequately protect the teeth, however, they have further added to the bulk, weight and complexity of the wheel hub assemblies.

It is a principal object of the present invention to provide a wheel hub assembly for an ABS. The present invention, however, seeks to simplify construction while reducing both the weight and bulk of the wheel hub assembly.

Another object of this invention to provide a wheel hub assembly in which the spacing between the sensor and the sensed elements are readily maintained within acceptable tolerances, while preventing loosening of the sensed elements from the hub.

It is also an object of this invention to provide a wheel hub assembly in which rocks, stones, dirt, sand and other materials are prevented from becoming entrapped between the elements sensed by the sensor.

A further object of the invention is to provide for a composite wheel hub assembly which incorporates both ferrous and non-ferrous materials.

In achieving these objects, a method of constructing the present invention inserts a non-ferrous radially toothed ring into a casting mold and subsequently casts the hub, of a ferrous material, around the ring embedding the teeth within the raw casting. Gauging from the center of rotation of the hub assembly, the outside cylindrical surface of the raw casting, in the area of the hub barrel, is machined to the appropriate diameter. This machining removes a portion of the ferrous hub barrel and the non-ferrous ring leaving only a continuous, smooth cylindrical surface. The finished surface therefore includes portions of the ferrous hub and an exposed surface of the non-ferrous teeth. These teeth thus form non-ferrous, spaced apart "interruptions" in the ferrous material of the hub. The teeth, being embedded in the hub during casting and exposed during machining, remain "locked" in the hub as a result of the casting process. A sensor is located in close proximity to the "interrupted" exterior surface of the hub so that, during rotation of the wheel, the sensor will accurately detect the different material property characteristics of the hub assembly and allow wheel acceleration or deceleration to be determined.

By constructing the wheel hub assembly of the present invention with a continuous, smooth outer cylindrical surface, the sensed area is readily kept clean and free of foreign deposits, construction is simplified, size is reduced and weight is decreased. Problems such as cracking and distortion of the exciter ring, as previously occurred during press fitting of a ring onto the hub, are also eliminated.

Another advantage of the present invention is that the alternate materials sensed by the sensor form a smooth, coincidental cylindrical hub surface. Having been machined and gauged off of the actual center of rotation of the wheel hub assembly, tolerance stackups are eliminated and accurate spacing of the sensor, relative to the sensed area, is readily achieved. By being able to precisely locate the sensor in close proximity to the sensed surface, acceleration and deceleration, even during slow rotational speeds, can be accurately determined.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 2 is a transverse sectional view of the present invention showing the wheel hub assembly in a casting mold after rough casting;

FIG. 3 is a transverse sectional view taken substantially along line 3—3 in FIG. 1 showing the non-ferrous interruptions formed in the wheel hub assembly;

DETAILED DESCRIPTION OF THE PREFERRED EMBODIMENT

Figure 1:
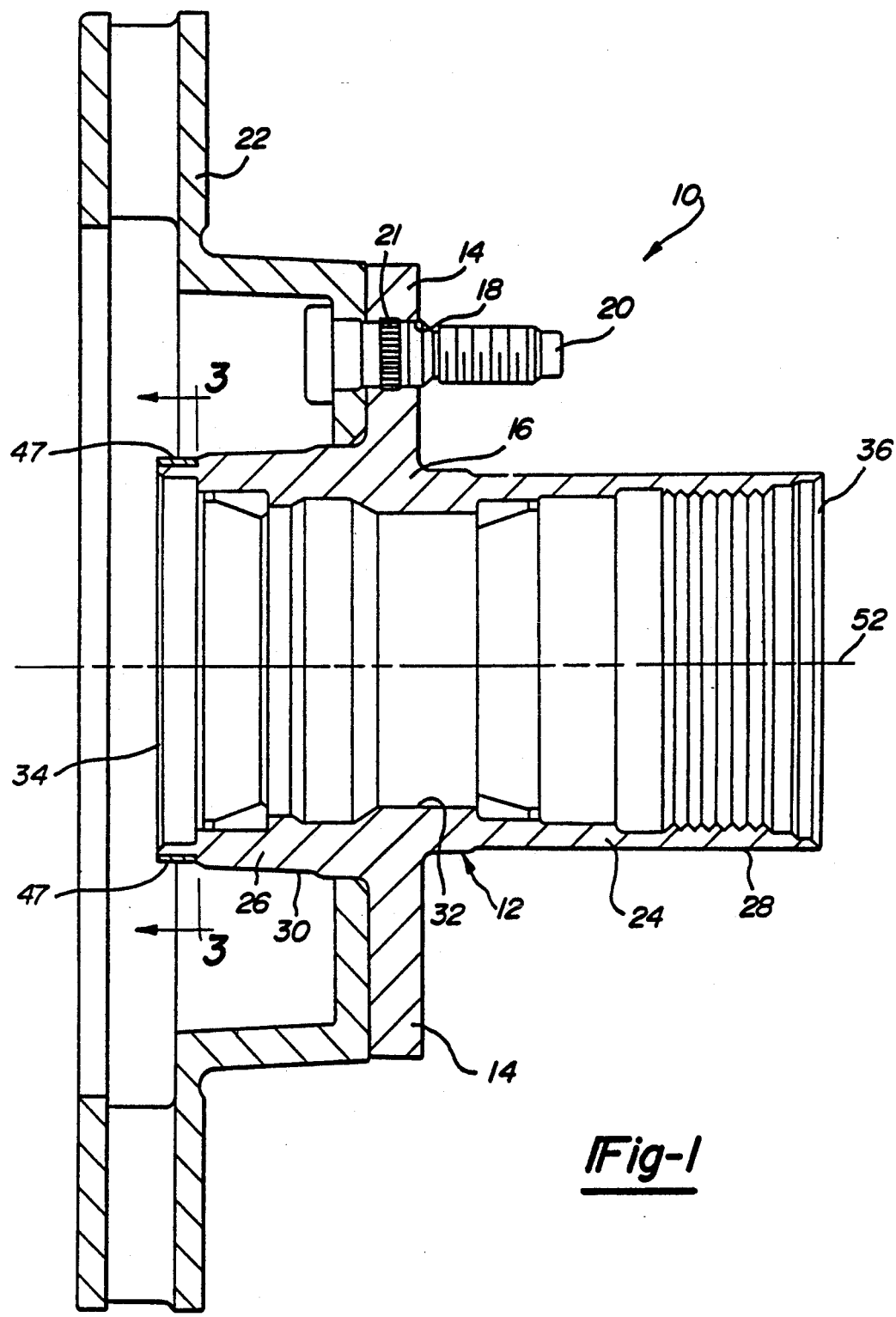
FIG. 1 is a longitudinal sectional view of a wheel hub assembly incorporating the principles of the present invention.

Referring to the drawings, a wheel hub assembly incorporating the principles of the present invention is illustrated in FIG. 1 and generally designated at 10. The wheel hub assembly 10 includes a hub 12 having a plurality of spaced elements or interruptions 47 formed coincidental with its exterior surface.

A central bore 32 extends through a main body or barrel 16 of the hub 12 and terminates at an inboard end 34 and an outboard end 36. The bore 32 receives either a driven or non-driven axle (not shown) of the vehicle.

A wheel mounting flange 14 extends radially outward from the main body 16 and include bores 18 that receive threaded wheel mounting studs 20. The wheel mounting studs 20 may be knurled, as designated at 21, or otherwise provided for press-fit engagement within the bores 18. In addition to providing a mounting for the wheel itself, the wheel mounting flange 14 and the wheel mounting studs 20 also may secure or provide a mounting for a brake rotor 22. The wheel mounting flange 14 further divides the hub 12 into an outboard barrel 24 and an inboard barrel 26, each respectively having a generally cylindrical, exterior barrel surface 28 and 30.

In constructing the wheel hub assembly 10 of the present invention, a non-ferrous exciter ring 40 is positioned within a casting mold 41 and located off of an outer mold half 42 as shown in FIG. 2. An inner mold half 43 is then positioned to capture the ring 40 within the mold cavity.

The exciter ring 40 of the embodiment shown in FIGS. 2 and 3 includes a generally circumferential band 44 having toothed projections or teeth 46. The teeth 46 protrude radially inwardly from the band 44. Once the exciter ring 40 has been properly located within the casting mold 41, molten ferrous material for the hub 12 is poured into the mold 41 producing a raw casting of the wheel hub assembly 10 in which the teeth 46 of the exciter ring 40 are firmly embedded. As seen in FIG. 2, the teeth 46 are embedded interiorly of the hub 12 and do not extend radially through the thickness of the hub 12.

After the raw casting has been removed from the mold 41, the external barrel surfaces 28 and 30 are machined to their proper dimensions. These surfaces 28 and 30 are machined while being gauged off of the center of rotation 52 of the wheel hub assembly 10. During machining, the band 44 of the exciter ring 40 is completely removed leaving the teeth 46 as elements or interruptions 47 embedded within the hub 12 at spaced intervals circumferentially about the inboard barrel 26. As seen in FIG. 3, an exterior surface 48 of the interruptions 47 smoothly corresponds to and is coincidental with the inboard barrel surface 30. While the interruptions 47 are shown and preferably located adjacent to the inboard end 34 of the hub 12, alternative locations could readily be employed. Also, in addition to the generally rectangular cross sectional shape shown for the interruptions 47, other shapes or configurations which interlock the interruptions 47 within the hub 12 can be used.

Figure 4:
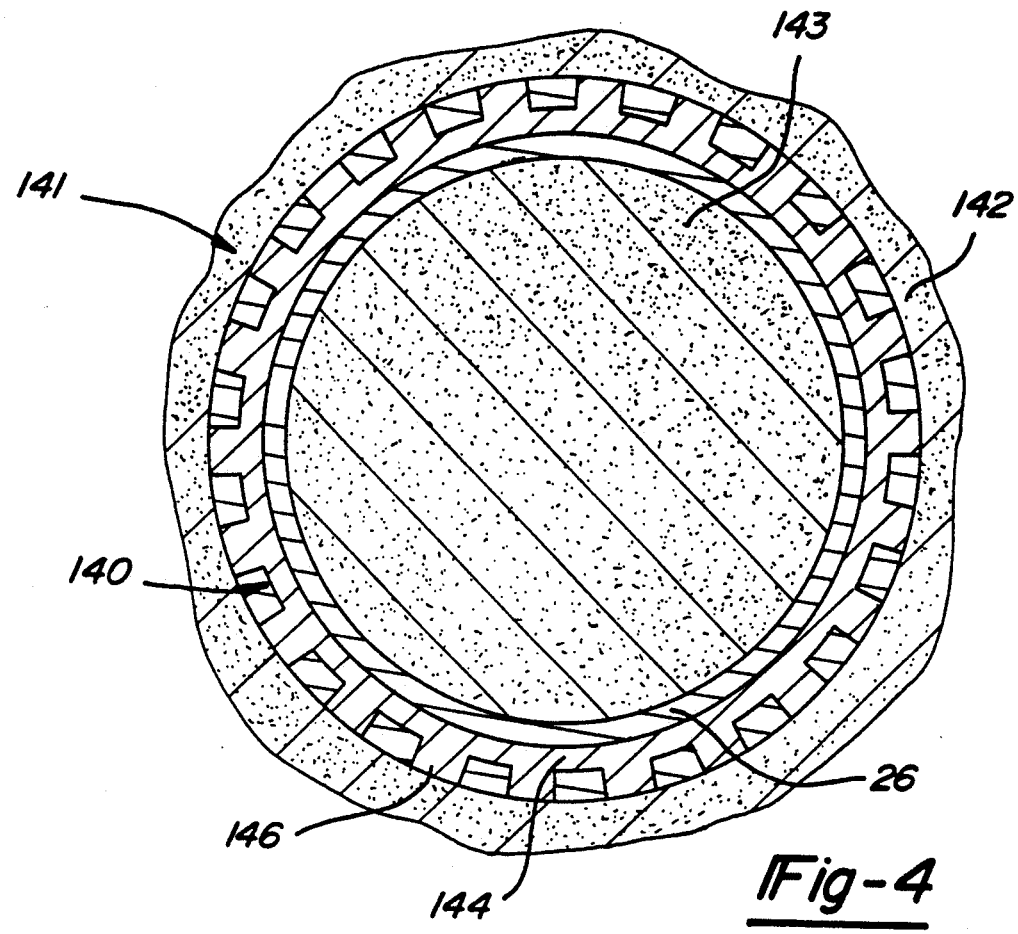
FIG. 4 is a transverse sectional view of another embodiment of the present invention showing the non-ferrous exciter ring as having external teeth and being cast within a wheel hub assembly.
Figure 5:
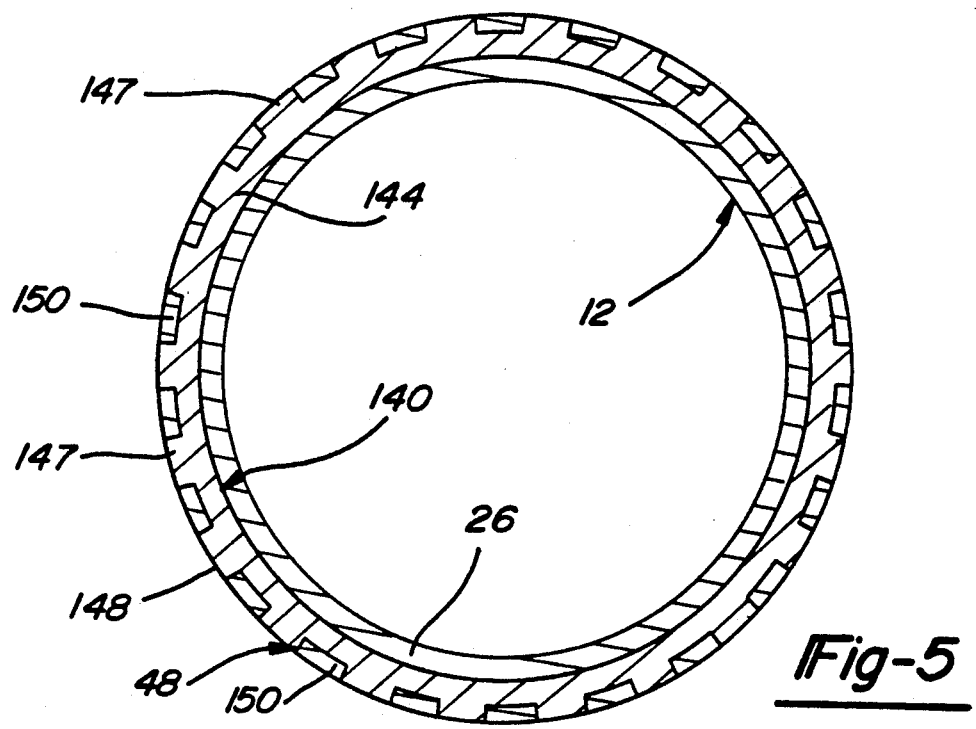
FIG. 5 is a transverse sectional view showing the finished hub casting of FIG. 4.

In a second embodiment of the present invention, seen in FIGS. 4 and 5, a non-ferrous exciter ring 140 is positioned within a casting mold 141 and located off of an outer mold half 142. The exciter ring 140 of this second embodiment includes a generally circumferential band 144 from which extend radially outward tooth projections or teeth 146. An inner mold half or core 143 is then positioned to capture the ring 140 within the casting mold 141. Alternately, the ring 140 could be located off of the core 143 rather than the outer mold half 142.

Once the exciter ring 140 is located within the mold 141, molten ferrous material for the hub 12 is poured into the mold 141 producing a raw casting of the hub assembly 10 in which the teeth 146 of the exciter ring 140 are encapsulated and firmly embedded within the hub 12. The band 144 is also encapsulated within and interlocks the exciter ring 140 with the hub 12.

The raw casting is then removed from the mold 141 and the barrel surfaces 28 and 30, being gauged off of the center of rotation 52, are machined to their proper dimensions. During machining of the second embodiment, the inboard barrel surface 30 is machined away only in an amount necessary to expose a portion of the teeth 146. This leaves the teeth 146, with a reduced height, as elements or interruptions 147 embedded within the hub 12 at circumferentially spaced intervals about the inboard barrel 26. Machining ensures that the exterior surfaces 148 of the interruptions 147 smoothly correspond and are coincidental with the finished inboard barrel surface 30.

With the interruptions 47 and 147 being non-ferrous, their presence provides uniformly spaced regions of high reluctance. Because of this, during rotation of the wheel hub assembly 10, a variable reluctance sensor (not shown) or inductive pickup mounted in close proximity to the inboard surface 30, in the area of the interruptions 47 or 147, will detect an area 50 or 150 of ferrous material respectively between each adjacent non-ferrous interruption 47 or 147 and produce a corresponding electrical pulse allowing acceleration or deceleration of the wheel to be determined.

The formation of the exterior surfaces 48 and 148 of the interruptions 47 and 147 coincidental with the inboard barrel surface 30 of the hub 12 has several advantages. First, it is impossible for deposits of rock, sand, dirt, mud, etc. to become lodged in gaps between teeth 46 or 146. In previous toothed wheel hub assemblies this was common. The present design thus eliminates cumbersome guards. Also, by gauging off of the center of rotation 52 of the wheel hub assembly 10 during machining of these surfaces, precise dimensioning and close spacing of the sensor relative to the surface 30 is readily achieved. The precise spacing of the sensor from the hub surface 30 additionally allows for accurate detection of acceleration and deceleration, particularly at low rotational speeds. Because of spacing variances in previous designs, low speed acceleration/deceleration was problematic to detect. No increase in machining costs are incurred by the present invention because the exterior barrel surface 30 of the raw casting is ordinarily machined when producing a hub either with or without an exciter ring. Further, significant size and weight reductions are gained by the compact construction of the present invention and the elimination of the band 44 from the first embodiment of the present invention.

While the above description constitutes the preferred embodiments of the present invention, it will be appreciated that the invention is susceptible to modification, variation and change without departing from the proper scope and fair meaning of the accompanying claims.

What is claimed is:

1. A wheel hub assembly for an anti-lock braking system utilizing a sensor, said assembly comprising:
    a cast hub of ferrous material, said hub including a generally cylindrical body and a radially extending wheel mounting flange extending from said cylindrical body, said body having an inboard end, an outboard end, a inner bore and substantially cylindrical outer surface; and
    a plurality of non-ferrous elements, said non-ferrous elements being integrally cast into said hub and substantially embedded within said body, said non-ferrous elements being circumferentially and equidistantly spaced around said body with ferrous portions of said hub therebetween, each of said non-ferrous elements having an exposed element surface coincidental with said cylindrical outer surface of said body, said non-ferrous elements forming non-ferrous interruptions between said ferrous portions of said hub for alternately being sensed by said sensor during rotation of said wheel hub assembly.

2. A wheel hub assembly according to claim 1 wherein said elements are substantially adjacent to said inboard end of said hub.

3. A wheel hub assembly according to claim 1 wherein each of said elements is independent of one another.

4. A wheel hub assembly according to claim 1 wherein said elements are interconnected with one another.

5. A wheel hub assembly according to claim 4 wherein said elements are interconnected with one another by an annular band integrally formed therewith and embedded within said body of said hub.

6. A rotatable wheel hub assembly for a vehicle having an anti-lock braking system including a sensor, said assembly comprising:
    a hub formed of a first material, said hub including a generally cylindrical body having an inboard end, an outboard end, a central bore and a generally cylindrical outer surface, said hub also including a wheel mounting flange extending radially from said body; and
    a plurality of individual elements each being formed of a second material and being independent of one another, said elements being integrally cast and substantially embedded at equidistantly spaced apart locations within said hub with a portion of said hub extending between adjacent elements, each of said elements having an element surface coincidental with said outer surface of said hub thereby forming a smooth composite surface, whereby during rotation of said assembly the sensor alternately senses said first material of said portions between said elements and said second material of said elements.

7. A wheel hub assembly according to claim 6 wherein said elements are circumferentially positioned and radially spaced about said body.

8. A wheel hub assembly according to claim 6 wherein said first material is ferrous.

9. A wheel hub assembly according to claim 6 wherein said second material is non-ferrous.

10. A rotatable wheel hub assembly for a motor vehicle having an anti-lock braking system including a sensor, said assembly comprising:
    a ferrous hub including a generally cylindrical body having an inboard end, an outboard end, and a substantially cylindrical outer surface;
    a wheel mounting flange extending radially from said body outer surface;
    a non-ferrous exciter ring having a generally annular shape, said ring including a generally circular band having a plurality of radially directed elements; and
    said elements being integrally cast and substantially embedded within said hub with portions of said hub between adjacent elements, said elements each having an exposed element surface being coincidental with said outer surface of said hub and cooperating to form a smooth composite surface, whereby during rotation of said assembly said sensor alternately senses said elements and said portions between adjacent elements.

11. The assembly according to claim 10 wherein said elements are radially directed outward from said band.

* * * * *